April 25, 1961 S. H. TURNER, SR 2,981,202
MASS TRANSPORTATION SYSTEMS
Filed April 16, 1959 6 Sheets-Sheet 1
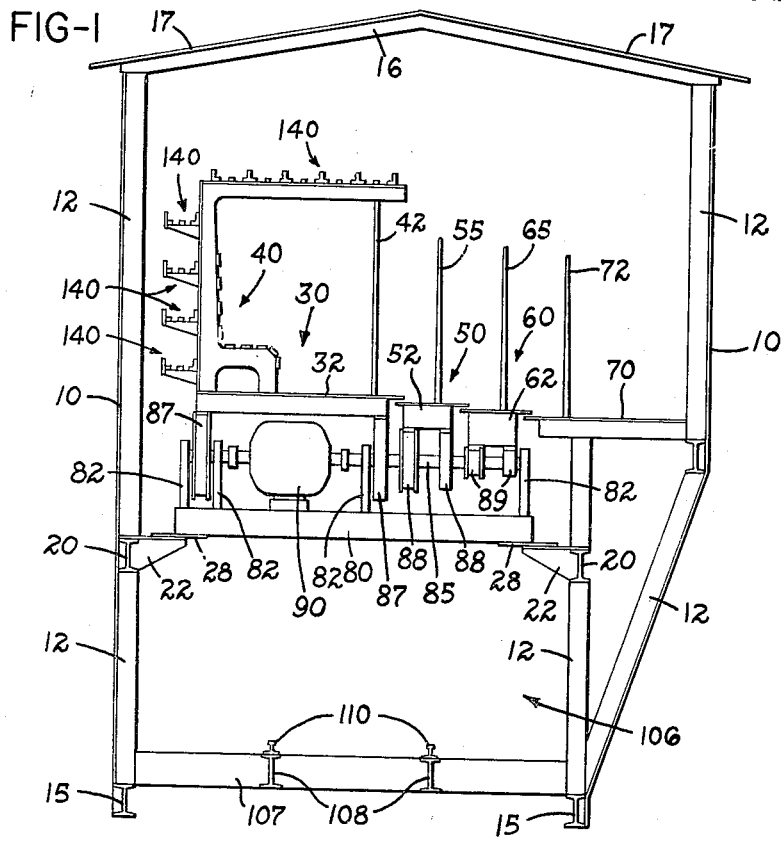
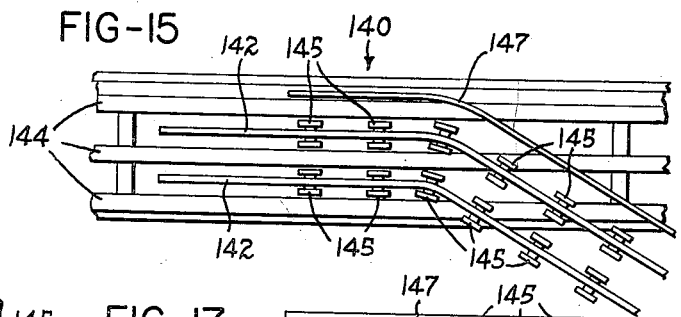
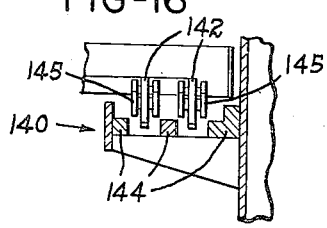
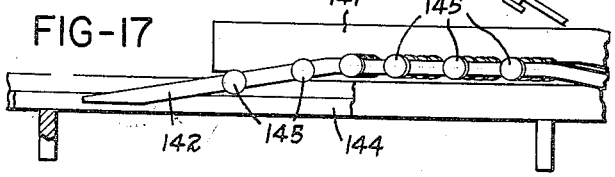
INVENTOR.
STEPHEN H. TURNER, SR.
BY
Marshal, Biebel, French & Bugg
ATTORNEYS

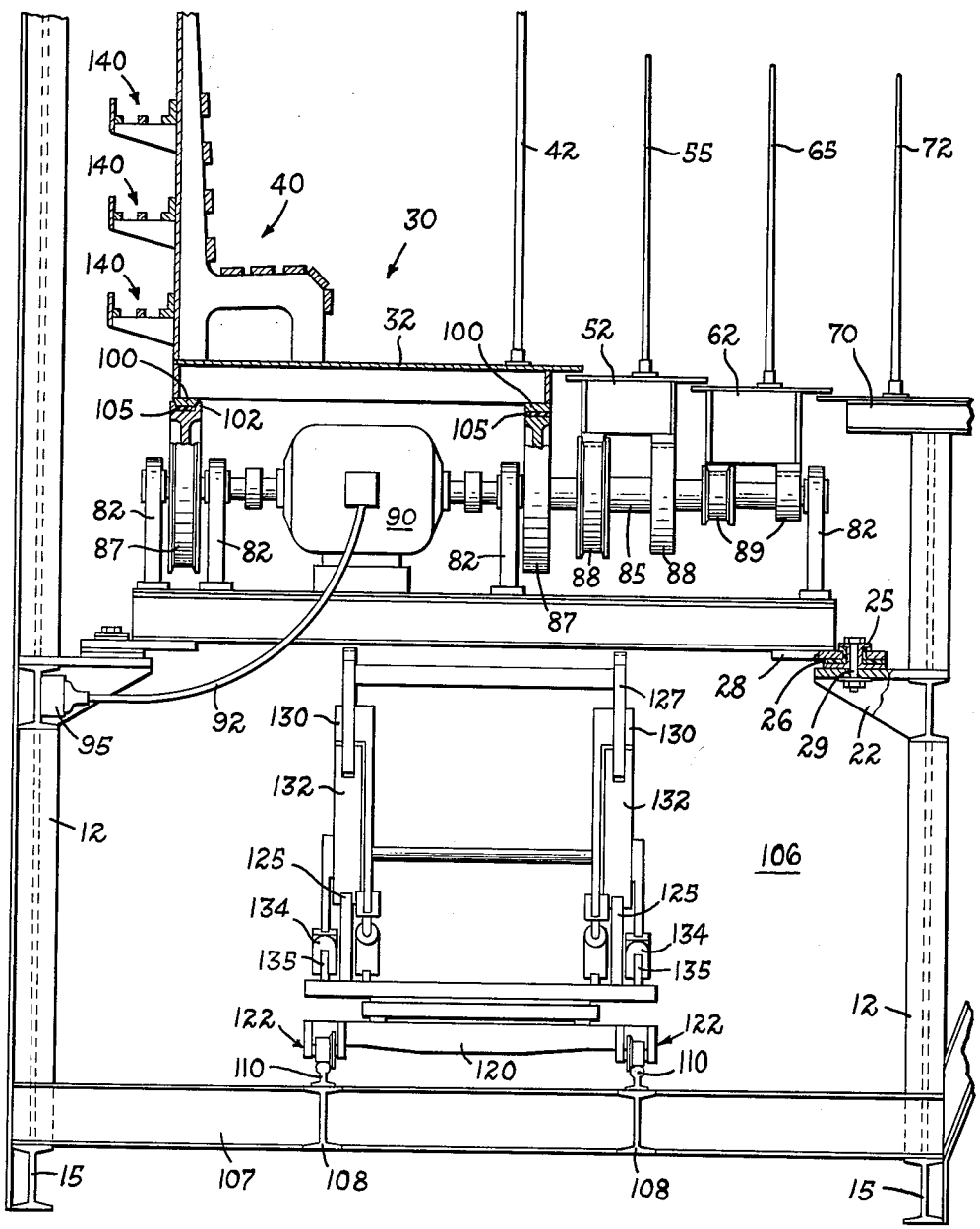
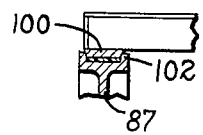
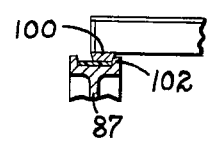

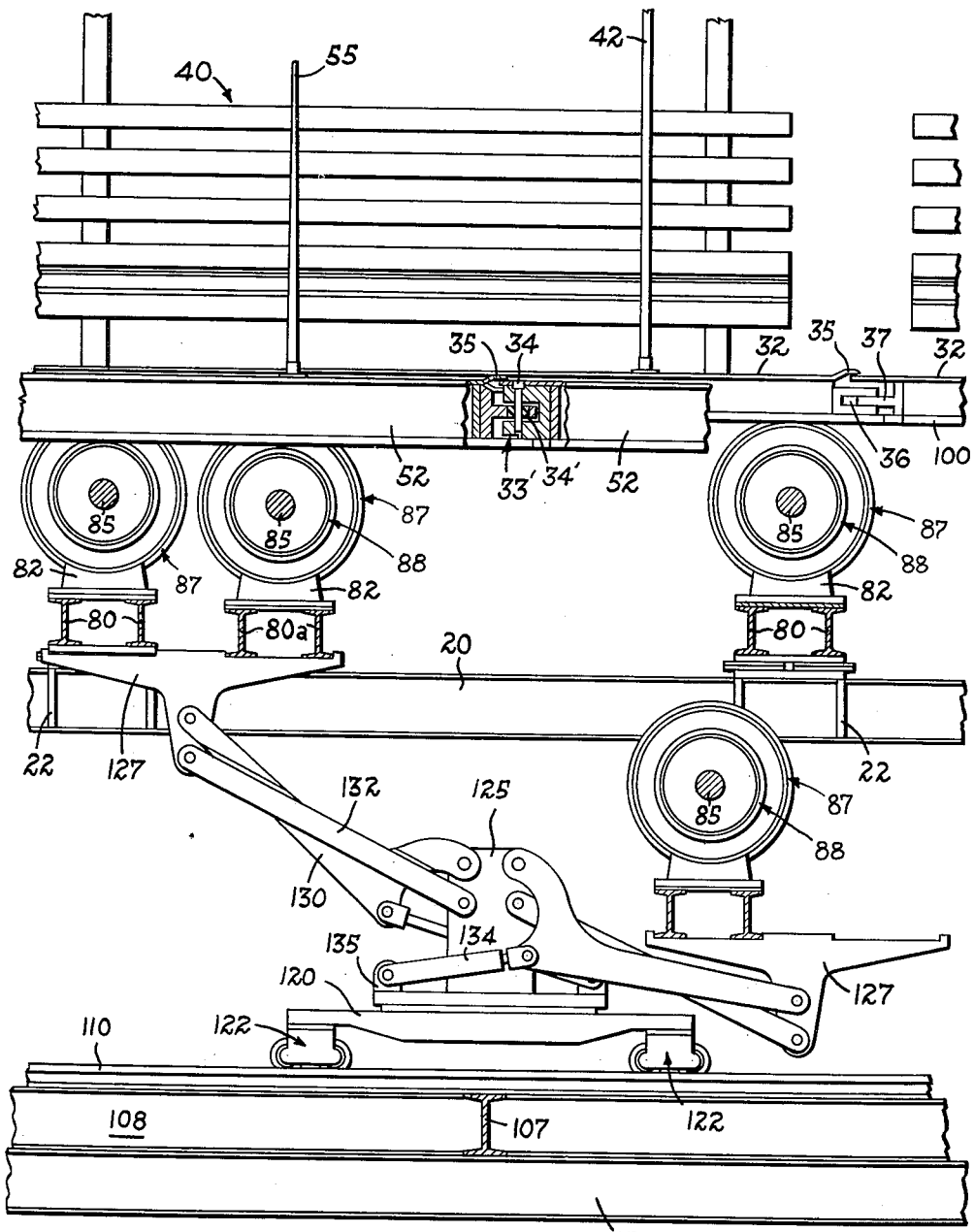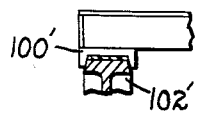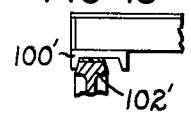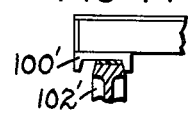

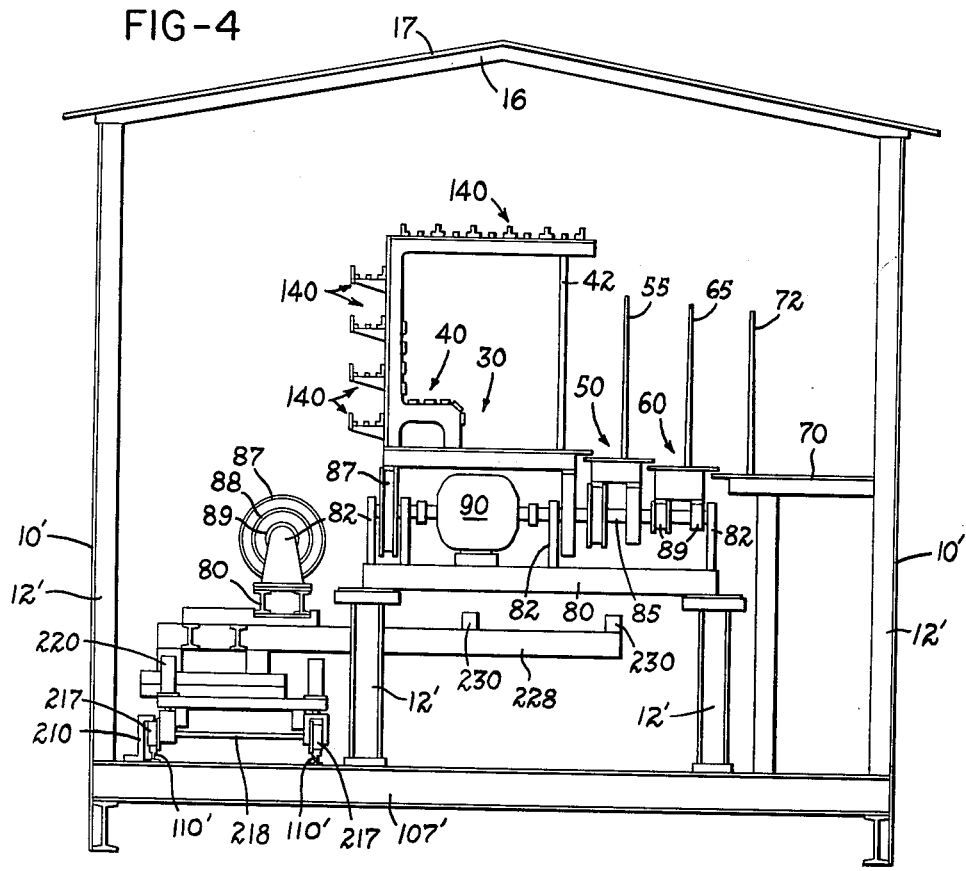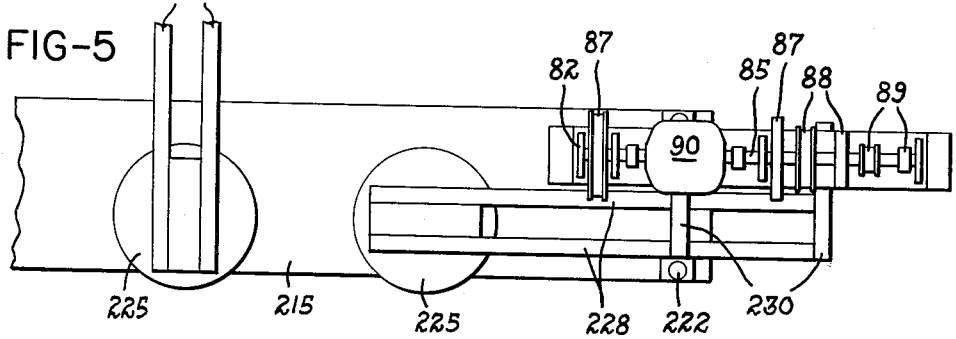

April 25, 1961 S. H. TURNER, SR 2,981,202
MASS TRANSPORTATION SYSTEMS
Filed April 16, 1959 6 Sheets-Sheet 5

INVENTOR.
STEPHEN H. TURNER, SR.
BY
Marshall, Biebel, French & Bugg
ATTORNEYS

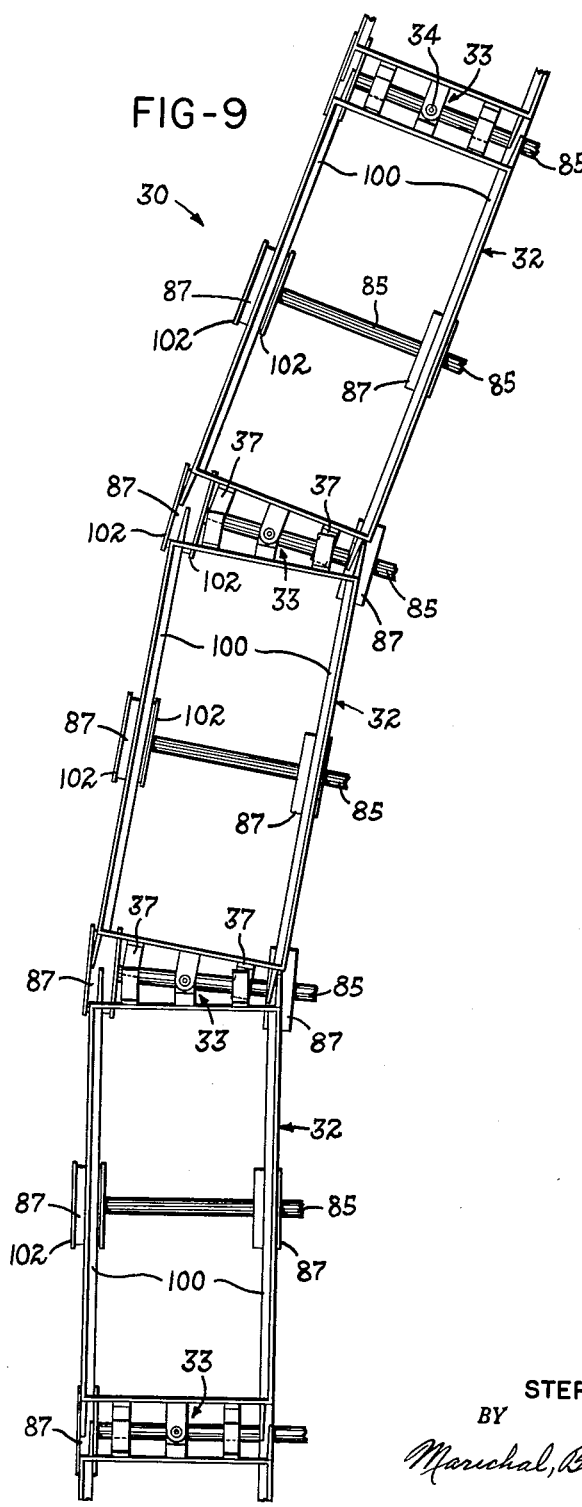

United States Patent Office 2,981,202
Patented Apr. 25, 1961

2,981,202
MASS TRANSPORTATION SYSTEMS
Stephen H. Turner, Sr., 719 Grand Ave., Dayton, Ohio
Filed Apr. 16, 1959, Ser. No. 806,808
12 Claims. (Cl. 104—25)

This invention relates to mass transportation systems, particularly to systems embodying a plurality of continuous or endless constantly moving trains which operate at relatively different speeds such that persons may progress from a stationary platform through relatively slower moving trains to a main train which is operating at considerable speed.

Various types of continuously moving mass transportation systems have been proposed, including some systems which operate with a plurality of trains moving at relatively different speeds. However, the arrangement has been such that construction and maintenance problems are presented which have made these systems impractical from the standpoint of economical building and maintenance. The present invention provides a system whereby large numbers of people may be conveyed at relatively high speed, and since the system is continuously moving it is capable of transporting such large numbers of people while requiring only enough power to keep the system in motion, since forces due to inertia, i.e., starting and stopping, can be substantially eliminated.

Furthermore, the present invention provides such a system wherein maintenance crews can readily service the driving and supporting equipment for the trains without interrupting operation thereof, and wherein the entire system is flexibly mounted to reduce to a minimum the noise within the enclosure where the system operates. The continuous trains are mounted for movement over sets of wheels of different diameters, corresponding to the desired peripheral speeds which determines the linear speed of the respective trains. These sets of wheels are carried on common shafts, and certain of the sets incorporate drive units which provide the input power to the system. The space between successive sets of wheels may be related to the length of the individual cars in the trains such that any car can span the distance between three adjacent sets of wheels, although this is not entirely necessary. Thus a complete set can be dismounted for repair and/or replacement without interrupting the continuous movement of the trains. In the same manner, the power input sets can likewise be removed for repair or replacement. Therefore, the system as described herein obtains economic operation by reason of its ability to remain running during repair and maintenance work thereon.

Accordingly, the primary object of this invention is to provide an improved continuously moving mass transportation system which is quiet and efficient in operation, upon which major repairs and maintenance may be carried out while the system is maintained in operation.

Another object of the invention is to provide such a system wherein a plurality of drive units are provided, any one of which may be removed and/or replaced while the system is maintained in operation.

A further object of the invention is to provide such a mass transportation system which is completely enclosed within a housing which may be divided into upper and lower levels, and wherein the endless continuously moving trains or conveyors operate in the upper level while the lower level includes a trackway for repair and maintenance equipment, or wherein the housing may be of one level with a trackway to one side for repair and maintenance equipment.

Another object of the invention is to provide such a system which also includes apparatus for transporting cargo items as well as passengers, and for unloading the cargo items at desired stations or central locations.

Another object of the invention is to provide supporting sets of wheels for the trains of a mass transportation system having a plurality of endless trains moving at relatively different speeds, and to provide resilient mountings for the entire wheel sets to absorb vibration and thus reduce the noise of the system in operation.

Other objects and advantages of the invention will be apparent from the following description, the accompanying drawings and the appended claims.

In the drawings—

Fig. 1 is a vertical section through a system of the type provided by the present invention;

Fig. 2 is an enlarged section similar to Fig. 1, showing construction details of the system;

Fig. 3 is an enlarged partial elevational view with parts broken and in section, showing the arrangement of the maintenance equipment beneath the transportation equipment;

Fig. 4 is a view similar to Fig. 1, showing a method of using maintenance equipment from one side instead of from underneath;

Fig. 5 is a view looking down on side maintenance equipment carrying a wheel unit in position for travel along the system;

Figure 7:
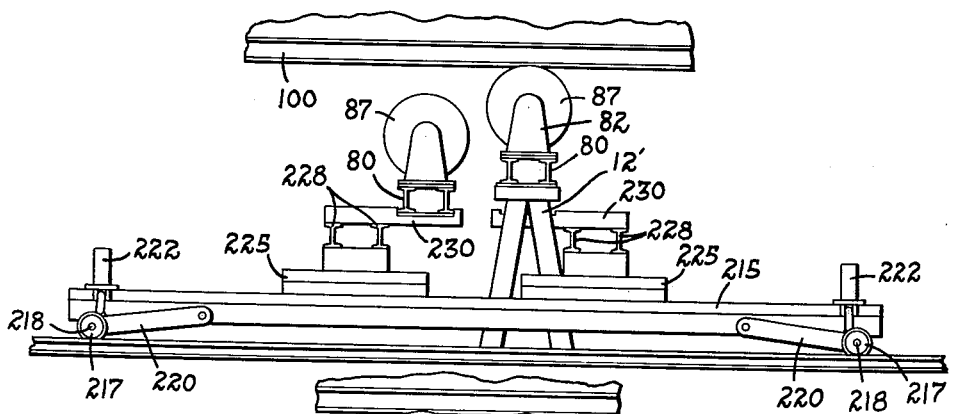
Figure 8:
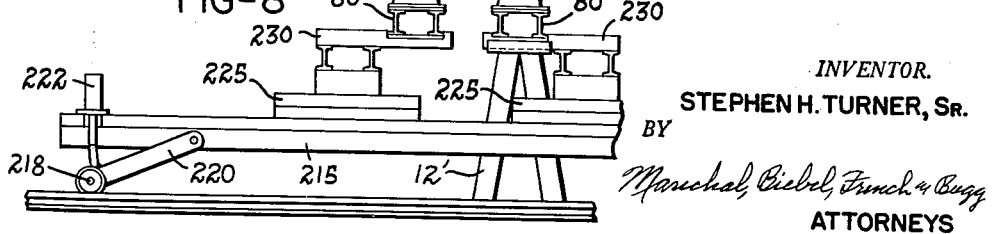

Figs. 7 and 8 are side elevations showing procedure in using side maintenance equipment to replace a wheel unit in operation with another wheel unit that has been serviced, where Fig. 7 shows a maintenance car in lowered position to permit the replacement wheel unit to be swung in under the continuously moving cars of the conveyor system and the other arm to be swung in under the wheel unit in operation, and Fig. 8 shows the maintenance car in raised position so that both wheel units are supporting the continuously moving cars of the conveyor system and the previously empty arm is now holding the wheel unit that is to be replaced;

Fig. 9 is a skeleton view looking down on the cars of the conveyor system and their rails, couplings, leveling lugs and wheel units carrying them around a curve;

Figs. 10 and 11 are detail views of the wheel rim construction at curves in the system;

Figs. 12, 13 and 14 are detail views of a modified type of wheel rim construction;

Fig. 15 is a partial plan view of baggage or cargo removal equipment;

Fig. 16 is a sectional view through the cargo removing equipment; and

Fig. 17 is a side elevational view of the cargo removing equipment shown in Fig. 15.

Referring to the drawings which illustrate preferred embodiments of the invention, Fig. 1 is a somewhat schematic cross section through one length of the system, which is laid out in a closed circuit as well known in the art, and wherein the entire system is enclosed within a housing provided by side walls 10 supported on generally vertical beams 12 which may be placed at appropriate spacings along the housing, and which may mount upon footer beams 15 at the bottom. The housing is enclosed at the top by a roof arch beam 16 supporting the roof panels 17 which extend substantially the full length of the system, as well known in the art, to provide a weathertight enclosure for the entire system, whereby passengers may ride and move about protected from the elements. The main structure of the system includes mounting rails 20 which are supported by the rails 12, as shown in Fig. 1, in an elevated position with respect to the footer rails 15, and which are provided at convenient lengths with cantilever type inwardly extending mounting brackets 22.

Details of the mounting bracket structure are shown in Fig. 2, wherein one bracket 22 is shown supporting a central bushing 25 surrounded by suitable shock absorbing rubber-like material (or similar) 26 upon which the mounting plates 28 are carried. This bushing and mounting plate structure is in turn secured to the bracket 22 by a suitable bolt and nut fastener 29 or the like. Therefore, the mounting plates 28 are carried in somewhat flexible relation with respect to the brackets 22, and the flexible intermediate material 26 also serves to absorb shock and reduce noise due to vibration or the like transmitted from the moving parts to the supporting framework.

The continuous trains which comprise the major moving parts of the system are provided by a plurality of flatbed cars coupled to make up a plurality of independently movable continuous trains. Each train includes couplings and leveling lugs of the same general construction. In Fig. 3, details of a coupling are broken out in the intermediate speed train, and details of the leveling lugs are shown in the high speed train. Thus, referring to Figs. 1-3 and 9, the high speed or main conveyor train 30 is made up of a number of cars 32 (Fig. 3) which may be coupled together by tongue and groove couplings 33 which are held together by a through pin or bolt 34 extending through a flexible bushing 34', such that there is but a slight amount of vertical play in the coupling. Preferably, the floor of one car includes the raised end 35 overlapping the edge of the floor of the next car, as shown in Fig. 3, to maintain a continuous surface in the train.

On opposite sides of the coupling tongue, on the leading car, are slots 36 (Figs. 3 and 9) which receive guide tongues 37 projecting from the following car, and serving to maintain the surface bed of the cars substantially even when the trains pass around curves. As shown, the guide tongues are shortened with respect to slots 36, for permitting relative movement of the cars about the axis defined by coupling pin 34.

Each of the cars 32, which comprise the main or high speed train, carries a bench 40 upon which the passengers may be seated, and stanchions 42 are also provided at suitable spaced locations along the cars for assisting the passengers in transferring to and from the next or intermediate speed train 50. This train is likewise made up of a plurality of cars 52 similarly coupled together, as by the couplings previously designated by the general reference numeral 33. The couplings in the second train are also designated 33', and like parts have similar reference numerals. The intermediate speed train is also provided with a plurality of spaced stanchions 55 extending upwardly from the cars 52.

The low speed train 60 is made up of a number of cars 62 coupled serially by the same type of couplings (not shown), and having stanchions 65 extending upwardly therefrom to provide hand holds for passengers transferring to and from this train.

The space between the low speed train 60 and the side wall 10 is filled by a horizontal stationary platform 70 which provides access to the entire upper interior of the system for inspection or the like, as well as serving as station platforms, which may be suitably enlarged, at main transfer points where traffic of passengers entering and leaving may be heavier. The platforms 70 are provided with stationary stanchions 72 at suitable points along the length thereof, primarily to provide hand holds for passengers exiting from the low speed train 60 to the stationary platform.

At each of the locations of brackets 22 there is a set of wheels which supports the trains for independent movement, and also provides, in certain cases, for a motive drive to the trains. One such drive unit is shown in Figs. 1 and 2 as including a main or supporting cross beam 80, of which there are preferably two as shown in Fig. 3, and which include a plurality of suitably spaced and mounted bearing brackets 82 at appropriate locations transversely of the mounting beams 80. These brackets support a cross shaft 85 upon which sets of wheels for each train are mounted for common rotation.

The arrangement is such that the difference in diameter between the wheels for each train will produce the desired difference in speed or velocity of the trains. Thus, for the high speed train 30 the pair of largest wheels 87 is provided, while wheels 88 of intermediate size support the cars 52 of the intermediate speed train 50, and the smallest pair of wheels 89 support the cars of the low speed train 60. In those wheel units desired to incorporate the drive, a suitable electric motor 90 may be mounted to rotate shaft 85, deriving its source of electrical energy from a connection 92 (Fig. 2) with a power supply line 95 extended along one of the beams 20 in the housing. Obviously, other types of motors could be employed, but an electrical motor as shown is preferred because of its quiet operation, desirable efficiency, ease of maintenance and connection with a common power source, and other desirable characteristics well known.

To maintain proper alignment of the cars of each train with its appropriate set of supporting and/or driving wheels, the cars each having longitudinally aligned rails 100 fixed to the under surface thereof. One of each set of wheels is flanged, as indicated generally at 102 in Fig. 2, such that the rail 100 rides within the flange and maintains the necessary alignment. The supporting periphery of the wheels preferably includes a resilient lining 105 which acts as a further shock absorbing and noise reducing mounting. In locations where the cars will be passing around curves, the flange structure 102 may be widened with respect to the rail 100, providing for limited lateral movement of the rail within the flange, as shown in the details of Figs. 10 and 11. Of course, the periphery of the other or flat wheel would likewise require an increase in width to accommodate the other rail.

Also, if desired for reasons of expedient construction, the wheel rim-rail configuration may be reversed, as shown in Figs. 12-14, with the rail 100' being an inverted channel, and receiving a tapered wheel rim construction 102'. Figs. 13 and 14 illustrate this configuration as applied to curves in the system.

In either construction, the widening of the rail or wheels, together with proper angled setting of successive wheel units as shown in Fig. 9, will guide the cars around curves in the system. Furthermore, all cars in a turn will be guided by cars ahead and behind, because the trains are endless. It should be noted (Fig. 9) that the rails are overlapping and tapered at the ends of cars, to permit relative movement between the straight rail sections of successive cars, as the train passes around a curve, while maintaining continuous support to the rails around the curve.

The above described wheel construction applies equally to those wheels used in supporting the intermediate and low speed trains, as will be apparent from inspection of Figs. 1 and 2. The only difference in these instances is that the wheels are of appropriate reduced diameter to provide the desired differential speeds of the trains.

The space between the main supporting beams 20 and the footer beams 15 provides a maintenance passageway 105, the floor of which is provided by cross beams 107 and longitudinally extending beams 108 having rails 110 mounted thereon to provide a lower trackway for inspection and repair cars or other equipment. The design of the system as above described is on a modular basis such that the wheel units or sets may be removed, replaced, and interchanged, as can likewise the drive units which incorporate motors 90. The number and location of these drive units with respect to the other or idler units will vary with the design of the system, the power requirements, etc.

In mass transportation systems such as above described one of the primary advantages of the system is derived from its ability to operate continuously, thus off-setting possible greater initial construction costs, and possibly in some cases slightly greater power requirements, by ability to move a great number of people or goods through continuous operation. In the present system such continuous operation is assured by the construction, arrangement, and mounting of the wheel units and drive units which may be unbolted and removed from their mounting brackets 22, and replaced with like units, without interference with the continuous operation of the several trains of the system.

A suitable maintenance car for this purpose is shown in Fig. 3, incorporating a bed 120 mounted on wheel trucks 122 which operate on the rails 110. The central portion of bed 120 carries a pedestal 125, and elevator platforms 127 of like construction are carried fore and aft of the maintenance car on similar parallel linkage systems, each including a drive link 130 and a guide or idler link 132. These links include conventional pivotal mountings (such as sleeve bearings) with the elevator members 127 and the pedestal 125, at their opposite ends. Each of the drive links 130 is connected to a lift or elevator control motor 134 of the piston-cylinder type, preferably hydraulic, which is pivotally mounted at its other end in a bracket 135 secured to the pedestal 125 on the car.

Operation of this maintenance equipment will be obvious from inspection of Fig. 3, wherein one set of wheels mounted on cross rails 80 has been unbolted from its bracket supports 22, and another set mounted on frame members 80a is in position to be moved over the mounting brackets as the first set is removed for forward motion (to the left in Fig. 3) of the maintenance car. The second set may then be bolted in place. The entire operation occurs without affecting the continuous movement of the trains operating above. In the case of a drive unit, the connection 92 to the power source 95 can easily be plugged or unplugged, to connect or disconnect the drive motor 90 from its source of energy, and since there are a number of such power units in the system, the others can absorb the additional load for the short time necessary to replace one unit.

The system also incorporates parcel transportation equipment which includes a plurality of racks 140 extending from the back and over the top of the benches 40, and upon which packages or the like may be deposited for delivery to predetermined centralized locations in the system. At such locations, referring to Figs. 15-17, unloading racks are provided in the form of fingers 142 which bend downwardly beneath the longitudinal stringers 144 of the racks, and including rollers 145 upon which the parcels will be positioned as the racks move beneath and relative to the fingers 142. A side guide or rail 147 extends along an edge of the rack and serves to guide the parcels as they move up over the rollers 145 and direct them away at an angle from the direction of movement of the racks. Thus, with stations including pick-up fingers of this type at various centralized positions on the system, it is possible to place parcels on the racks and have them conveyed to the next station which has discharge equipment aligned with a given rack, where the parcels will be automatically dispersed. The parcels may therefore be centrally assembled for the convenience of a delivery system or the like operating from that point. Obviously, the discharge fingers and side guide construction may be made adjustable such that they may be selectively moved into operative relation with the racks for gathering parcels moving thereon.

Figure 6:
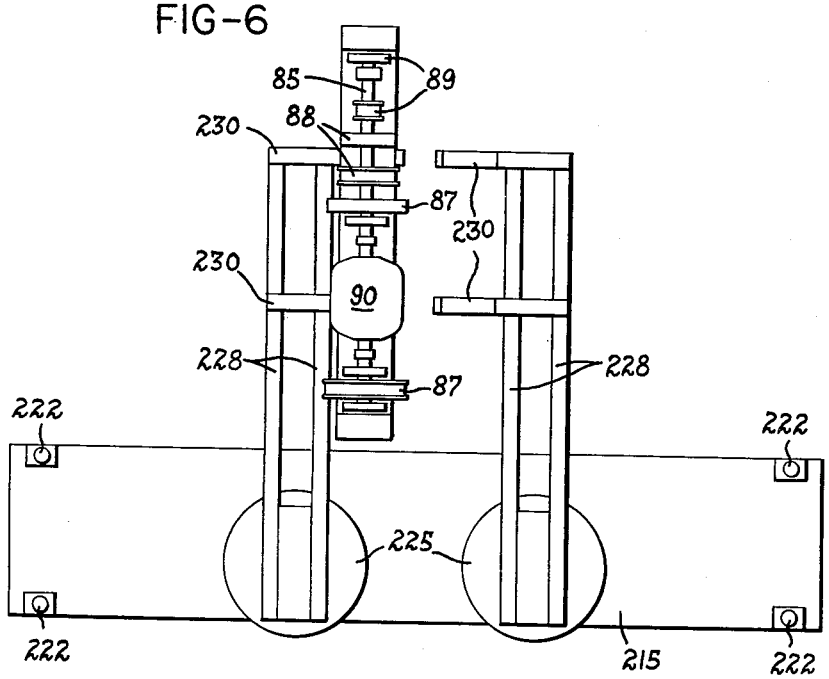
Fig. 6 is a view looking down on side maintenance equipment with the new wheel unit in position to replace a wheel unit now in operation.

The alternate layout and maintenance system is shown in Figs. 6-8, wherein the outward housing is somewhat wider and of less height, and wherein the maintenance trackway, etc. is located to one side of the passenger and cargo carrying trains. The structure of the trains and boarding platform is the same as previously described, and is therefore designated by the same reference numerals. Similar parts in the supports, housing, and maintenance structures are designated by the same reference numerals, with a prime added. Thus, the maintenance car trackway 110' is situated upon the lower supporting beam 107' to one side of the train supporting columns 12', with the housing columns or beams 10' located to the outside. The maintenance trackway preferably includes a further rail 210 of a Z-shape in cross-section which may engage the top of the wheels of the maintenance car on one side to prevent toppling of the maintenance car in operation, as will presently be described.

In this modified system, the wheel sets are still replaced from beneath, during continuous operation of the system, and for this purpose a maintenance car having a bed 215 and running upon wheels 217 (Fig. 4) may be driven along the maintenance trackway 110'. The wheels are carried on axles 218 which are in turn mounted upon radius arms 220 pivotally connected to the bed of the maintenance car, as shown particularly in Figs. 7 and 8. A conventional hydraulic cylinder 222 is mounted on each corner of the car bed and connected through suitable linkage to the wheel-axle system such that the radius arms may be pivoted to cause a raising and lowering of the car bed 215 with reference to the rails 110'.

On the bed 215 are a pair of turrets 225 carrying booms 228 which have laterally projecting arms 230 designed to support an entire wheel set or unit, as shown in Figs. 5-8. The turrets can rotate between a position wherein the booms extends longitudinally of the car and a position extending laterally of the car and beneath the train system, as shown in Figs. 4 and 6. Thus, when it is desired to replace a wheel unit the maintenance car may be driven to the desired location with a replacement wheel unit carried on one of the booms. The empty boom may then be swung beneath the operating wheel unit to be replaced and the other boom swung adjacent this location to move the replacement wheel unit into position beneath the trains.

Then, by appropriately actuating the cylinders 220 the entire car may be raised, with the empty boom engaging beneath the wheel unit to be replaced and supporting it so that it may be disconnected from its mountings (the same as the mountings 25 et seq. shown in Fig. 2) and the car may be moved along the track to switch the wheel units and align the replacement unit with the mountings for attachment thereto, while the unit being replaced is taken from its mountings and moved to a position where it may subsequently be swung back, together with its supporting boom, over the bed of the maintenance car for removal to a repair shop.

Accordingly, the present invention provides a novel continuously operating mass transportation system which is capable of moving large numbers of people in congested areas. The system may be boarded by stepping from a stationary platform 70 onto the first or low speed train 60 which may move, for example at about 4 m.p.h., and then stepping to the next or intermediate speed train which may move at approximately 8 m.p.h., with the differential speed as to the low speed train therefore being only 4 m.p.h. Finally, the passengers may step to the high speed train which may move at about 12 m.p.h., with the speed differential only being approximately 4 m.p.h., and thus the passengers may be conveyed to one station from another at a rate of speed approaching 12 m.p.h., while the differential speed operation of the various trains provides for ready and comfortable access to and from the high speed train. The modular construction of the supporting wheel sets and drive units permits the continued operation of the system during repairs, and the maintenance passageway provides ready access, enclosed from the elements, by which repair workers may constantly care for the moving parts of the system without interferring with its operation.

It is understood that the arrangement of trains shown in the drawings is merely illustrative of the features of the present invention. If a greater highest speed is desired, or if it is desired to reduce the speed differential between adjacent trains, the number of trains may be increased as expedient, consonant with the design configurations of the entire system. In all cases, however, the speed differential between adjacent trains will be maintained such that transfer by passengers from one train to the next may be accomplished easily and comfortably, as for example in boarding and discharging from an escalator type of moving stairway.

At the same time, the advantages of modular construction and ease of maintenance, and maintenance access, provide a practical system which may be constructed from readily available parts and materials, and which may be kept in continuous operation, thereby gaining the advantage of reducing power requirements for accelerating and decelerating the various trains of the system to an absolute minimum. Furthermore, with power being supplied at a plurality of locations around the system, and with the individual drive motors being readily disconnected from the system for replacement, the drive to the system is smooth and continuous, with low friction losses and minimum surging or jerking of the parts. The entire system is supported on resilient mountings, for example on the drive wheel mounts, on the drive wheel rims, and in the coupling bushings, thereby lowering the noise of the system to a minimum, as is desirable when operating within a complete weatherproof enclosure such as disclosed.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Mass transportation apparatus comprising a substantially continuous housing divided into upper and lower levels, a plurality of sets of wheels, each said set including a plurality of pairs of wheels of different diameters supported on a common shaft, mounting means for each of said shafts, means within said housing intermediate said levels at regularly spaced positions along the length thereof providing supports for said mountings of each set including bracket means extending inwardly of the sides of said housing, releasable means connecting said mountings to said bracket means providing for removal of an individual set of wheels by detachment of said releasable means and movement of said mountings longitudinally of said housing to space between said brackets, a plurality of cars connected serially into a number of trains equal to the number of pairs of wheels in each set, said cars being coupled to form a plurality of continuously movable platforms upon which passengers and/or cargo may be carried, means providing a drive for some of said sets of wheels to propel said trains at different linear velocity related in accordance with the diameter ratios of the pairs of wheels in each set, and means providing a continuous maintenance passageway having access to said lower level and said mountings for said sets of wheels while said trains are maintained in continuous motion.

2. Mass transportation apparatus comprising a substantially continuous housing divided into upper and lower levels, a plurality of sets of wheels, each said set including a plurality of pairs of wheels of different diameters supported on a common shaft, mounting means for each of said shafts, means within said housing intermediate said levels at regularly spaced positions along the length thereof providing supports for said mountings of each set including bracket means extending inwardly of the sides of said housing, releasable means connecting said mountings to said bracket means providing for removal of an individual set of wheels by detachment of said releasable means and movement of said mountings longitudinally of said housing to space between said brackets, vibration damping means associated with each of said releasable means for isolating vibration in the associated set of wheels and mountings from said brackets and said housing, a plurality of cars connected serially into a number of trains equal to the number of pairs of wheels in each set, said cars being coupled to form a plurality of continuously movable platforms upon which passengers and/or cargo may be carried, means providing a drive for some of said sets of wheels to propel said trains at different linear velocity related in accordance with the diameter ratios of the pairs of wheels in each set, and means providing a continuous maintenance passageway having access to said sets of wheels while said trains are maintained in continuous motion.

3. Mass transportation apparatus comprising a substantially continuous housing divided into upper and lower levels, a plurality of sets of wheels, each said set including a plurality of pairs of wheels of different diameters supported on a common shaft, each of said wheels having a resilient ring about the rim thereof providing a sound absorbing contact member, unitary mounting means for each of said shafts forming therewith a replaceable sub-assembly, means within said housing intermediate said levels at regularly spaced positions along the length thereof providing supports for said mountings of each set including bracket means extending inwardly of the sides of said housing, releasable means connecting said mountings to said bracket means providing for removal of an individual set of wheels by detachment of said releasable means and movement of said mountings longitudinally of said housing to space between said brackets, vibration damping means associated with each of said releasable means for isolating vibration in the associated set of wheels and mountings from said brackets and said housing, a plurality of cars connected serially into a number of trains equal to the number of pairs of wheels in each set, said cars being coupled to form a plurality of continuously movable platforms upon which passengers and/or cargo may be carried, means providing a drive for some of said sets of wheels to propel said trains at different linear velocity related in accordance with the diameter ratios of the pairs of wheels in each set, and means providing a continuous maintenance passageway having access to said lower level for maintenance and/or replacement of said sets of wheels while said trains are maintained in continuous motion.

4. Mass transportation apparatus comprising a substantially continuous housing divided into upper and lower levels, a plurality of sets of wheels, each said set including a common shaft and a plurality of pairs of wheels of different diameters, means within said housing providing releasable mountings for each said set intermediate said levels at regularly spaced positions along said housing providing space in said upper level for a continuous passenger and cargo compartment and also providing maintenance space in said lower level, a plurality of cars connected serially into a number of trains equal to the number of pairs of wheels in each set, said cars extending in each train in substantially continuous relation to provide a continuous movable platform upon which passengers and/or cargo may be carried, means providing a drive for some of said sets of wheels to propel said trains at different linear velocities related in accordance with the diameter ratios of the pairs of wheels in each set, a trackway extending along said lower level parallel to said sets of wheels, and a maintenance car on said trackway including lift means capable of moving a selected set of wheels toward and away from its associated mountings and supporting said selected set while said trains are maintained in continuous motion.

5. Mass transportation apparatus comprising a substantially continuous housing divided into upper and lower levels, a plurality of sets of wheels, each said set including a common shaft and a plurality of pairs of wheels of different diameters, means within said housing providing releasable mountings for each said set intermediate said levels at regularly spaced positions along the length of said housing providing space in said upper level for a continuous passenger compartment and also providing maintenance space in said lower compartment, vibration damping means in each of said mountings for isolating vibration in said set of wheels from said mountings and said housing, a plurality of cars connected serially into a number of trains equal to the number of pairs of wheels in each set, said cars being coupled to form a substantially continuous platform in each train for supporting persons and/or materials, means providing a synchronous drive for some of said sets of wheels to propel each of said trains at different linear velocities related as the diameter ratios of the pairs of wheels in each set, means in said lower level providing maintenance space for access to said sets of wheels while said trains are maintained in continuous motion, and maintenance apparatus operable in said maintenance space to provide temporary support for a selected set of wheels and a replacement set therefor during substitution of such replacement set for the selected set on the mountings for said selected set.

6. Mass transportation apparatus comprising a substantially continuous housing divided into upper and lower levels, a plurality of sets of wheels, each said set including a common shaft and a plurality of pairs of wheels of different diameters, means within said housing providing releasable mountings for each said set intermediate said levels at regularly spaced positions along the length of said housing providing space in said upper level for a continuous passenger compartment and also providing maintenance space in said lower compartment, vibration damping means in each of said mountings for isolating vibration in said set of wheels from said mountings and said housing, a plurality of cars connected serially into a number of trains equal to the number of pairs of wheels in each set, said cars being coupled to form a substantially continuous platform in each train for supporting persons and/or materials, means providing a synchronous drive for some of said sets of wheels to propel each of said trains at different linear velocities related as the diameter ratios of the pairs of wheels in each set, a maintenance trackway extending in said lower level beneath said trains, and means operable from said trackway to remove and replace individual wheel sets while maintaining operation of said trains.

7. Mass transportation apparatus comprising a substantially continuous housing divided into upper and lower levels, a plurality of sets of wheels, each said set including a common shaft and a plurality of pairs of wheels of different diameters, means within said housing providing releasable mountings for each said set intermediate said levels at regularly spaced positions along the length of said housing providing space in said upper level for a continuous passenger compartment and also providing maintenance space in said lower compartment, vibration damping means in each of said mountings for isolating vibration in said set of wheels from said mountings and said housing, a plurality of cars connected serially into a number of trains equal to the number of pairs of wheels in each set, said cars being coupled to form a substantially continuous platform in each train for supporting persons and/or materials, means providing a synchronous drive for some of said sets of wheels to propel each of said trains at different linear velocities related as the diameter ratios of the pairs of wheels in each set, a maintenance trackway extending along one side of said lower level, and means operable from said trackway and extendable into said lower level for replacing individual sets of wheels while said trains are in continuous operation.

8. In an endless moving conveyor transportation system the combination of a plurality of sets of wheels, each set including pairs of wheels of the same diameter mounted on a common shaft, means providing releasable mountings for said sets in predetermined spaced relation defining a path along which persons and/or materials are conveyed, a plurality of cars connected serially to form an endless train for each pair of wheels of like diameter, some of said sets of wheels having driving connections with the associated said shaft, means for driving the connected shafts at common uniform rotational speeds to propel said trains of cars at uniform velocities in ratios according to the diametrical relationships of different sized wheels of each set, means defining a trackway extending adjacent said path, means operable on said trackway including selectively operable lift means adapted to remove and replace a selected set of wheels and providing temporary support for the selected set and its replacement set independently of the releasable mountings therefor while continuous movement of said trains is maintained, a source of electrical power extending along said mounting means and including outlets for each of said driven sets of wheels, and electrical drive motors supported in driving relation with said driven sets of wheels including releasable connections to said power source providing for replacement of the entire set of driving wheels and the associated said drive motor.

9. In an endless moving conveyor transportation system the combination of a plurality of sets of wheels, means providing releasable mountings for said sets in predetermined spaced relation defining a path along which persons and/or materials are conveyed, a plurality of cars connected serially to form an endless train, means driving at least some of said sets of wheels to propel said cars along said path, means defining a maintenance trackway extending parallel to said path, and means operable on said trackway including selectively operable lift means operable to support a selected set of wheels and cars passing thereon independently of said releasable mountings and adapted to remove and replace a selected set of wheels.

10. In an endless moving conveyor transportation system the combination of a plurality of sets of wheels, each set including pairs of wheels of the same diameter mounted on a common shaft, means providing releasable mountings for said sets in predetermined spaced relation defining a path along which persons and/or materials are conveyed, a plurality of cars connected serially to form an endless train for each pair of wheels of like diameter, some of said sets of wheels having driving connections with the associated said shaft, and means for driving the connected shafts at common uniform rotational speeds to propel said trains of cars at uniform velocities in ratios according to the diametrical relationships of different sized wheels of each set, means defining a trackway extending below said path, and means operable on said trackway including selectively operable lift means operable to support a set of wheels independently of its said releasable mountings and adapted to remove and replace a selected set of wheels while continuous movement of said trains is maintained.

11. Apparatus as defined in claim 4, wherein parcel carrying racks are mounted on the highest velocity train, and pickup means mounted at suitable locations along the apparatus and adapted to remove parcels from said racks for collection of the parcels at said locations.

12. Apparatus as defined in claim 1 wherein said drive means include electrical motors connected to the shafts of the driven wheel sets and mounted therewith on the associated mounting means, and means providing releasable electrical power connections for said motors at positions where said driven wheel sets are supported.

References Cited in the file of this patent

UNITED STATES PATENTS

| | | |
|---|---|---|
| 731,292 | Dunwald | June 16, 1903 |
| 1,054,943 | Schmidt et al. | Mar. 4, 1913 |
| 1,096,960 | Seeberger | May 19, 1914 |
| 1,412,896 | Sachs | Apr. 18, 1922 |